Nov. 19, 1968   J. P. WADLECK   3,411,336
TUBE ROLLING MACHINE

Filed April 6, 1966   9 Sheets-Sheet 2

INVENTOR.
JOSEPH P. WADLECK
BY Bosworth, Sessions,
Herrstrom & Knowles
ATTORNEYS.

INVENTOR.
JOSEPH P. WADLECK
BY Bosworth, Sessions,
Herrström + Knowles
ATTORNEYS.

Nov. 19, 1968  J. P. WADLECK  3,411,336

TUBE ROLLING MACHINE

Filed April 6, 1966 9 Sheets-Sheet 7

INVENTOR.
JOSEPH P. WADLECK
BY Bosworth, Sessions,
Herrström & Knowles
ATTORNEYS.

United States Patent Office 3,411,336
Patented Nov. 19, 1968

3,411,336
TUBE ROLLING MACHINE
Joseph P. Wadleck, Snyder, N.Y., assignor to Blaw-Knox Company, Pittsburgh, Pa., a corporation of Delaware
Filed Apr. 6, 1966, Ser. No. 540,678
12 Claims. (Cl. 72—250)

ABSTRACT OF THE DISCLOSURE

A tube rolling apparatus of the type in which the working rolls are reciprocated and a workpiece is intermittently advanced into the bite of the rolls and is rotated during a time in the cycle when the rolls are not in working engagement with the workpiece. A chuck is provided on the exit side of the apparatus and is arranged to grip the workpiece firmly and rotate it at the proper time; however, the grip of the chuck is relaxed during each working stroke of the rolls to permit the workpiece to move through the chuck with relative freedom in accordance with the elongation of the workpiece that takes place at that time.

---

This invention relates to machines for rolling elongated workpieces such as tubes, rods, bars and the like, in which the rolls that do the work are reciprocated and the workpieces are intermittently advanced into the bite of the rolls and rotated between each working stroke of the rolls. More particularly, the invention relates to the mechanism for rotating the workpieces between working strokes of the rolls or, if desired, rotating and advancing the workpieces between working strokes of the rolls.

Machines of this general type that are adapted to roll tubular or other elongated workpieces between grooved die rolls in order to elongate the workpieces and reduce their diameter, and in the case of tubes, reduce their wall thickness, are well known. One successful machine is described in the Krause Patent No. 3,030,835, issued Apr. 24, 1962. Machines made according to this patent comprise a roll supporting saddle which is reciprocated by a drive mechanism. The saddle carries die rolls having opposed grooves adapted to do work on one or more tubular blanks or other workpieces interposed between the rolls. As the saddle reciprocates, the rolls are rotated by engagement between gears mounted on the rolls and racks mounted on the frame in which the saddle reciprocates. In tube rolling machines, one or more mandrels are provided. These extend into the space within the grooves of the rolls and function to support the workpieces during the rolling operation and to control the internal diameter of the tubes. Means are provided for loading tubular blanks on the mandrel as described, for example, in the aforesaid Krause patent.

In machines of the type disclosed in the aforesaid Krause patent, the working rolls engage the workpieces to reduce and elongate the work during each working or forward stroke of the rolls and are disengaged from the workpieces during the return stroke of the rolls. The workpieces are advanced a short distance, for example, one-quarter to one-half inch, and are rotated a fraction of a revolution, for example, about 60 degrees, during each return stroke of the rolls by chucks mounted in crossheads on the entry end of the machine. On the exit end of the machine, chucks mounted in stationary crossheads are employed to rotate the blanks during each return stroke. The rotatable exit chucks are necessary inasmuch as the trailing ends of the tubular blanks pass beyond the entry chucks some time before the blanks have passed through the mill. The exit chucks grip the tube rather lightly and with a constant force and are rotated in synchronism with the entry chucks to assist in rotating the tubes during the return stroke of the rolls. Since the tubes are reduced in diameter and greatly elongated during their passage through the machine, the reduced diameter tubes may slide through the exit chucks a distance of as much as 6 to 12 inches during each working stroke of the apparatus.

This system of rotation was eminently successful with machines of the size and type that were built at the time that the application for the Krause patent was filed. Recently, however, machines of greater capacity have been built in which the workpieces emerging from the rolls are of such small diameter (for example, one-half inch) and of such great length (for example, seven or eight hundred feet) that exit chucks which grip the emerging workpieces lightly enough to permit the workpieces readily to slide through them without marking them do not grip the workpieces firmly enough to always insure proper rotation of them after they have been released by the entry chucks.

In the machine of the Krause patent, the chucks on the exit end of the machine have no function with respect to advancing the workpieces except to permit the workpieces to slide through them, the advancing being accomplished entirely by the entry chucks; when the trailing end of a workpiece has been disengaged by the entry chucks of the machine, the forward end of the succeeding workpiece pushes the trailing end of the workpiece and thus feeds the workpiece through the machine. Difficulties have arisen in this phase of the operation with long workpieces. The ends of the workpieces under these circumstances may become split or may telescope one over the other. In this latter event, there is great danger that the machine may jam and that the die rolls will be damaged.

The general object of the present invention, therefore, is to eliminate the above-noted difficulties that are present with prior types of machines and to provide a machine having the ability to rotate and, if desired, to advance elongated workpieces even after the trailing ends of the workpieces have passed beyond the chucks on the entry end of the machine. Another object is to provide a machine having this ability in which the friction between the exit chucks and the workpieces during the working stroke of the machine is not great enough to damage the workpieces or substantially to impede the movement of the workpieces resulting from their elongation and in which the chucks grip the workpieces firmly enough, during the return stroke of the machine, to rotate and, if desired, advance them. Another object is to provide such machine which can be constructed at reasonable cost and which will be reliable and substantially foolproof in operation.

Briefly, according to a preferred form of the invention, these and other objects are accomplished by providing exit chucks which are controlled to grip the workpieces firmly during the return stroke of the machine, and relatively lightly, if at all, during the working stroke of the machine so that the elongated workpieces can slide readily through the chucks. The exit chucks are rotated to rotate the workpieces during the return stroke of the machine, this rotation being in synchronism with the rotation of the entry chucks and, if desired, the exit chucks may also be advanced to advance the workpieces during the return stroke, the advancing movement of the exit chucks also being synchronized with the advancing movement of the entry chucks. Preferably, the gripping jaws of the chucks are operated by compressed air, the operation of the chucks being controlled by suitable valves actuated by limit switches or the like in synchronism with the reciprocation of the saddle that carries the working rolls. The essential characteristics of the invention are summarized in the claims.

Referring now to the drawings,
FIGURES 1 and 1A together constitute a plan view of the complete machine.

*General arrangement*

Figures 1, 1A:
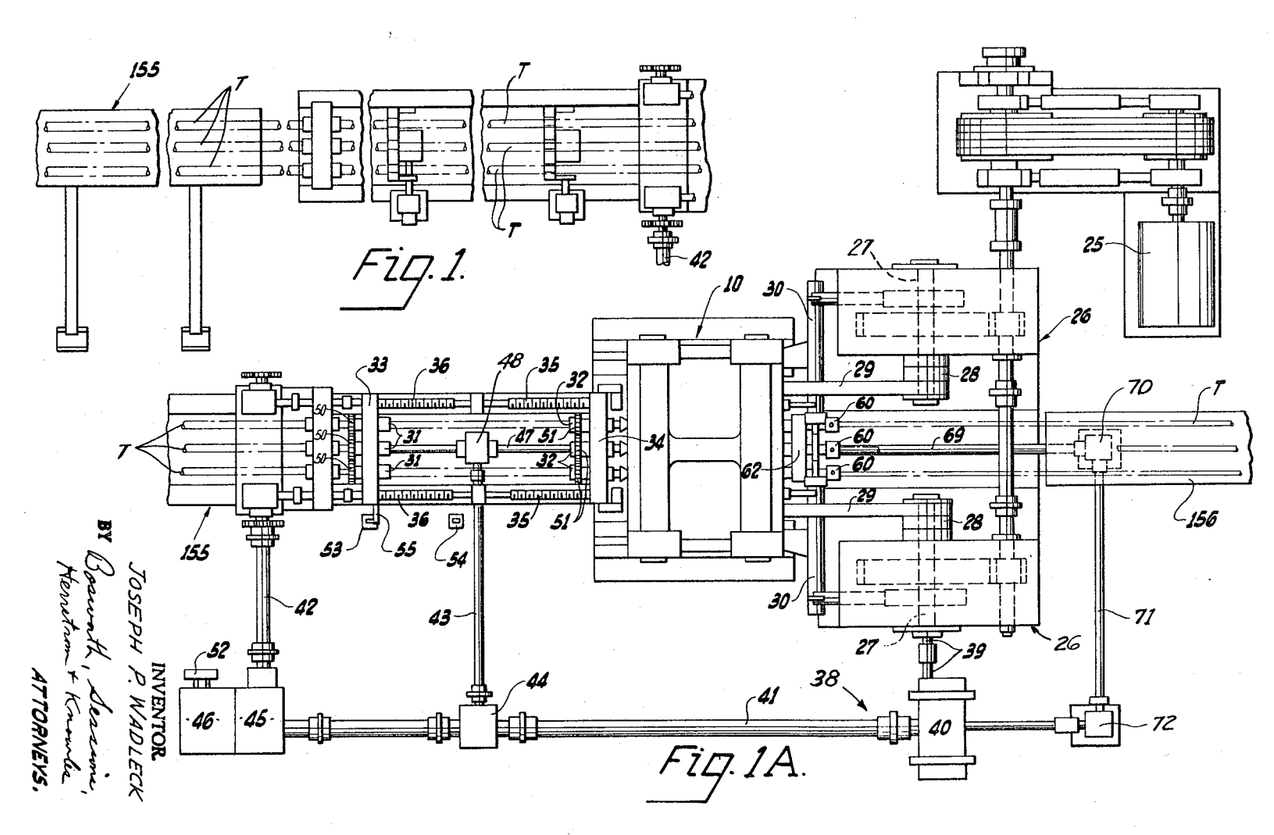
Figure 2:
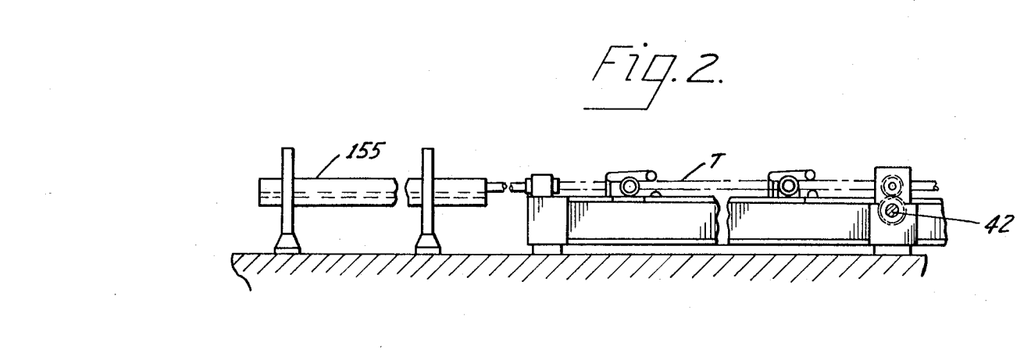
FIGURES 2 and 2A together constitute a side elevation of the machine shown in FIGURES 1 and 1A.
Figure 2A:
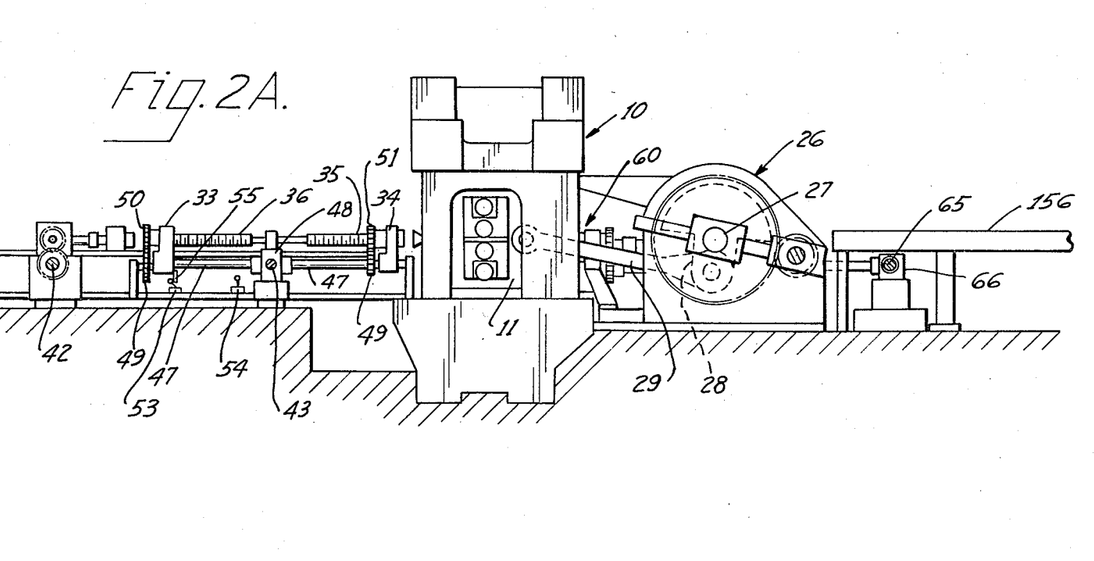
Figure 3:
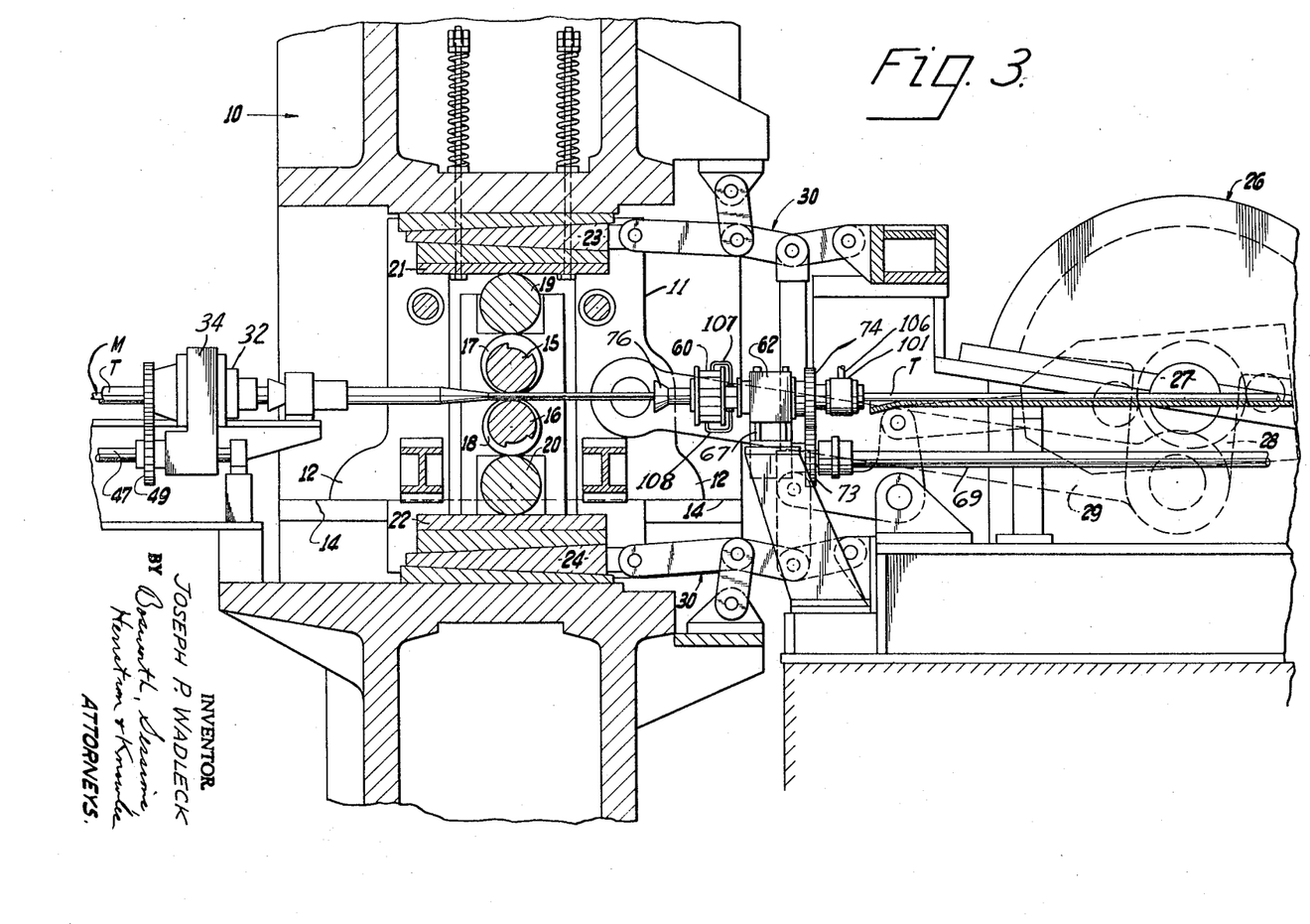
FIGURE 3 is a longitudinal, vertical, sectional view illustrating the mill housing, the saddle and the rolls and part of the main drive mechanism on an enlarged scale.

As shown in FIGURES 1, 1A, 2 and 2A the invention is described herein as applied to a machine that is similar to the machine shown in the aforesaid Krause patent. The machine comprises a mill housing indicated in general at 10 within which a saddle 11 is supported for reciprocation upon slides 12 that operate on tracks 14. See FIGURE 3. The saddle 11 carries working or die rolls 15 and 16, each roll having as many die recesses or grooves 17 and 18, respectively, as the number of workpieces that the machine is intended to work on simultaneously, in this instance three. The working rolls are supported by backup rolls 19 and 20 which are supported by upper and lower thrust plates 21 and 22, respectively. The thrust plates in turn are supported by movable wedges 23 and 24. When the wedges are in the working or inner position as shown in FIGURE 3 the die rolls 15 and 16 are held together in working position. When the wedges are withdrawn, the rolls 15 and 16 move apart and are disengaged from the workpieces.

The saddle 11 is reciprocated on tracks 14 by means of a motor 25 through a main drive mechanism indicated in general at 26 (FIGURES 1 and 2) and disposed at the exit or discharge end of the machine. The mechanism includes crank shafts 27 and cranks 28. Cranks 28 are disposed on either side of the pass line of the machine and are connected to the saddle by the connecting rods 29. The crank shafts and cranks are rotated at speeds of the order of 80 to 100 or more revolutions per minute, although this may be varied throughout a considerable range. Reciprocation of the saddle by the connecting rods causes the die rolls 15 and 16 and the backup rolls 19 and 20 to rotate. Positive rotation of these rolls is insured by the provision of stationary racks mounted in the housing 10 and pinions secured to the rolls as described in the aforesaid patent. The tubes T or other workpieces are fed into the working zone of the machine from the left in the arrangement shown in the drawings and are discharged to the right. The working stroke takes place as the saddle 11 is moved from left to right. When the workpieces are tubes, they are supported during the rolling operation by mandrels M having tapered points as described in the aforesaid Krause patent.

The wedges 23 and 24 are withdrawn at the end of each working stroke of the saddle 11 and replaced at the end of each return stroke by means of the wedge-operating mechanism indicated in general at 30 so that no work is done upon the tubes during the return stroke of the saddle and the rolls. During the return stroke, the tubes are advanced and are rotated a fraction of a revolution by chucks 31 and 32 carried by crossheads 33 and 34 disposed on the entry side of the machine. These crossheads are moved in opposite directions along the frame of the machine by feed screws 35 and 36. The feed screws are of opposite hand and are driven so that the crossheads alternately approach and withdraw from each other. The chucks in the crosshead that is advancing in the forward direction toward the roll stand and saddle are caused to grip the work while the chucks in the crosshead that is moving in the rearward direction away from the saddle are released from the work; the tubes are thereby advanced through the machine.

*Operation of entry chucks*

The crossheads 33 and 34 are moved toward and away from each other and the entry chucks 31 and 32 are rotated by the chuck rotating and advancing mechanism indicated in general at 38. These mechanisms are described in detail in the said Krause patent as are the chucks 31 and 32 and the crossheads 33 and 34, and that description will not be repeated herein. For purposes of this application, it is pointed out that the mechanism 38 is operated from the main drive 26 through the crank shaft 27 and a shaft 39 that drives an intermittent motion unit 40 that converts the continuous rotation of the shaft 39 into intermittent rotation of a line shaft 41 which extends at right angles to shaft 39 and parallel to the longitudinal axis of the machine.

In the preferred form of apparatus, the line shaft 41 rotates 60 degrees for each complete rotation of the input shaft 39; i.e., each complete cycle of reciprocation of the saddle 11. This rotation of the line shaft takes place entirely during the return stroke of the saddle when the working rolls are out of engagement with the tube. The line shaft 41 drives transverse shafts 42 and 43. Shaft 43 is driven through a bevel gear unit 44 and shaft 42 is driven through a bevel gear unit 45 and a reverse gear 46. Transverse shaft 43 drives a centrally disposed longitudinal shaft 47 through a bevel gear unit 48; this shaft in turn rotates the chucks 31 and 32 in the manner described in the Krause patent, through gears 49 (see FIGURE 3) keyed to shaft 47 and gears 50 and 51 that are associated with the chucks. Transverse shaft 42 drives the screws 35 and 36 that advance and retract the crossheads 33 and 34.

The direction of rotation of the screws is periodically reversed by the reversing mechanism 46 which is actuated by a fluid pressure cylinder 52. The cylinder in turn is controlled by an appropriate solenoid valve (not shown) and limit switches 53 and 54 which are engaged by an arm 55 mounted on crosshead 33. When the crossheads reach their farthest apart position as shown in FIGURES 1A and 2A, the cylinder 52 is actuated by the limit switch 53 and the direction of rotation of the screws 35 and 36 reversed so that the crossheads are caused to approach each other; when the crossheads approach closest to each other, the cylinder 52 is actuated in the appropriate direction by the limit switch 54 and the rotation of the screws is again reversed. At the same time, the chucks 31 and 32 are also controlled by solenoid valves actuated by the same limit switches so that the tubes are grasped only by the chucks that are moving toward the mill stand. Thus, the tubes are intermittently advanced toward the mill, although the crossheads alternately approach toward and recede from the mill stand.

With this mechanism, when a tube is no longer engaged by one of the chucks 31 or 32, the tube can only be advanced by being pushed by engagement between its trailing end and the forward end of a succeeding tube that is being fed toward the mill by the feed mechanism. Also, the chucks 31 and 32 are not effective to rotate tubes passing through the machine after the trailing ends of the tubes have passed to a position in which they are no longer engaged by either the chucks 31 or 32.

*Exit chucks*

According to the present invention, the difficulties that have arisen in the past because of lack of positive rotation of the tubes are overcome by providing exit chucks 60 that are positively rotated in synchronism with the entry chucks 31 and 32 and that are arranged to grip the workpieces firmly during the return stroke of the carriage while the chucks are being rotated and to engage the workpieces lightly or not at all during the working stroke of the carriage while the workpieces are being elongated and passed through the exit chucks.

Figure 6:
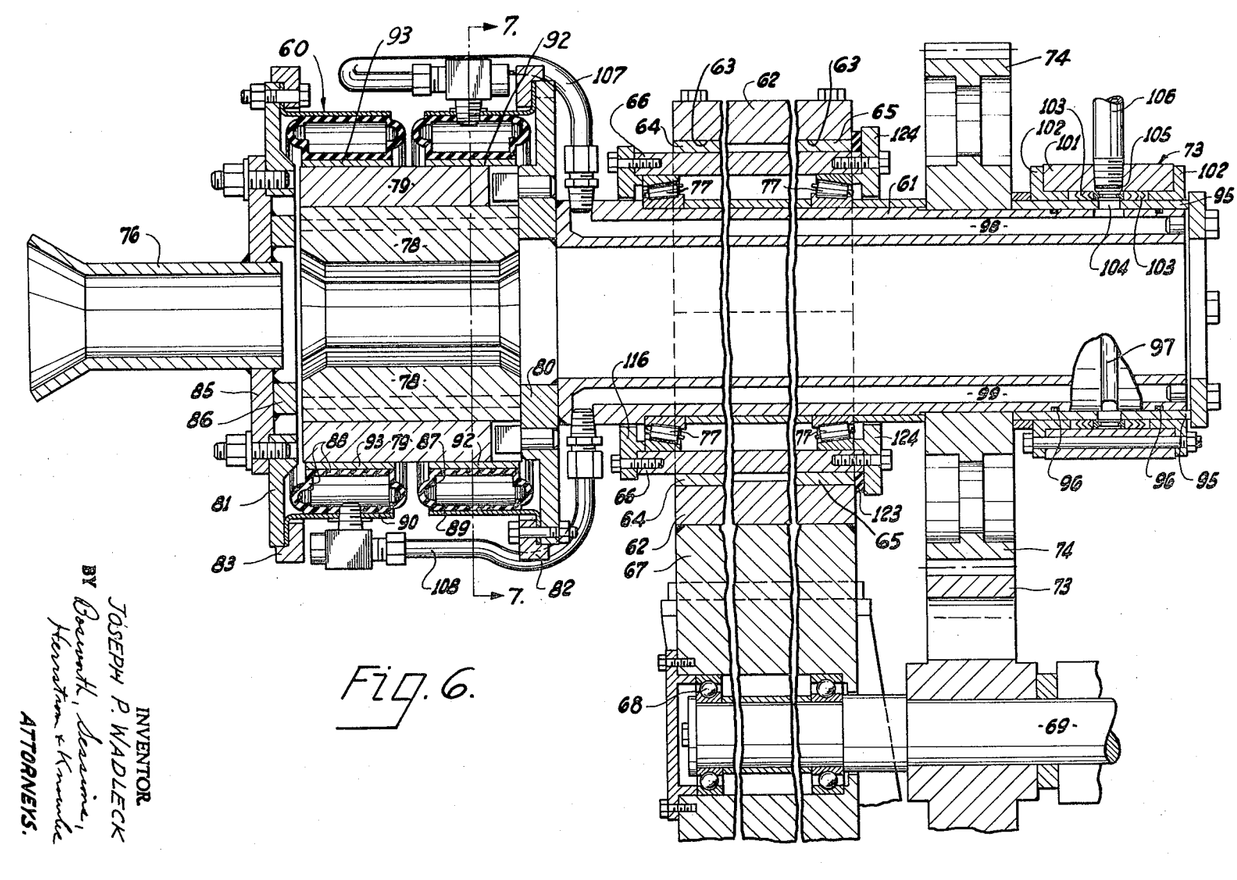
FIGURE 6 is a longitudinal cross section on an enlarged scale through one of the exit chucks and its supporting and drive mechanisms, the view being taken as indicated by line 6—6 of FIGURE 5.

The exit chucks 60 are shown in FIGURES 3 to 8 and are carried by spindles 61 which are supported by a housing 62. As shown in FIGURE 6, housing 62 is provided with cylindrical recesses 63 carrying appropriate bearings 64 and 65 in which cylindrical supports 66 for the spindles 61 are slidably mounted. The housing 62 in turn is carried by a supporting member 67 which extends upwardly from the base of the machine and which also functions to support the bearings 68 for the end of the shaft 69. Shaft 69 is driven from the intermittent drive mechanism 40 through bevel gearing 70, transverse shaft 71 and bevel gearing 72. Shaft 69 is thus rotated in synchronism with shaft 47 which rotates the entry chucks 31 and 32. Shaft 69 carries a gear 73 which meshes with a gear 74 on the central spindle 61 and gear 74 meshes with gears 75 on the outer spindles 61. (See FIGURE 8.) The gearing is similar to that employed for the entry chucks 31 and 32 and the exit chucks 60 are thereby rotated in synchronism with the entry chucks.

The chucks 60 and their associated mechanism are substantially identical and only central chuck will be described herein. As shown particularly in FIGURE 6, the chuck is provided with an entry guide 76 on the side of the chuck toward the mill and is carried by the cylindrical supporting spindle 61 as noted above. Spindle 61 is mounted in roller bearings 77 that are supported in the support 66. By this means, the chuck is supported for rotation in the housing 62, the rotation being effected by the gearing just described.

In order to grip tubes and other workpieces passing through it, the chuck has circumferentially arranged gripping jaws 78 that are supported by segments 79. These parts are guided for radial movement by an exit end plate 80 that is welded to the end of the spindle 61 and an entry end plate 81 that is supported by a built-up spider made up of end rings 82 and 83 and intervening longitudinally extending members 84 that are welded to the end rings. The annular ring 82 of the spider is bolted to the end plate 80 and the annular ring 83 supports the end plate 81. The end plate 81 supports a guide plate 85 carrying a guide ring 86. The entry guide 76 is welded to the guide plate 85.

In order to urge the jaws 78 inwardly into engagement with the workpiece, I preferably employ inflatable annular members 87 and 88. These are supported by flanged rings 89 and 90, the flanges of which are clamped between the end plate 80 and ring 82 and the ring 83 and plate 81, respectively. The inner surfaces of the members are provided with wear surfaces 92 and 93 that engage the outer surfaces of the jaw-supporting segments 79. Members 87 and 88 are of well-known construction and are commercially available as components for clutches and the like. They are composed of appropriately reinforced rubber or rubber-like material. With this arrangement, inflation of the members 87 and 88 with air or other fluid under pressure forces the jaw-supporting segments 79 and jaws 78 inwardly to grip a workpiece disposed within the jaws, while release of the fluid permits the jaws to relax their grip on the workpiece.

Figure 7:
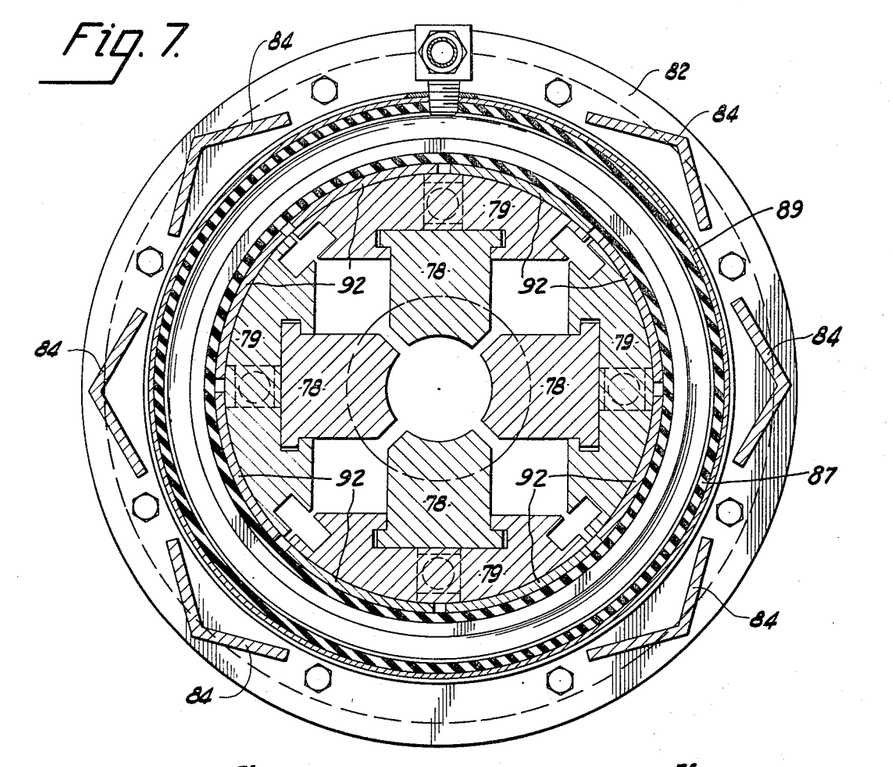
FIGURE 7 is a transverse sectional view to an enlarged scale taken on line 7—7 of FIGURE 6.
Figure 8:
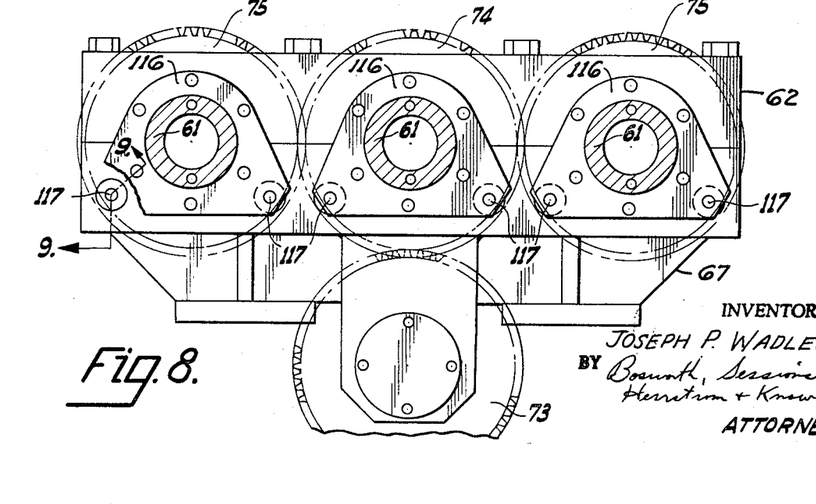
FIGURE 8 is a rear end elevation of the crosshead and exit chucks.
Figure 9:
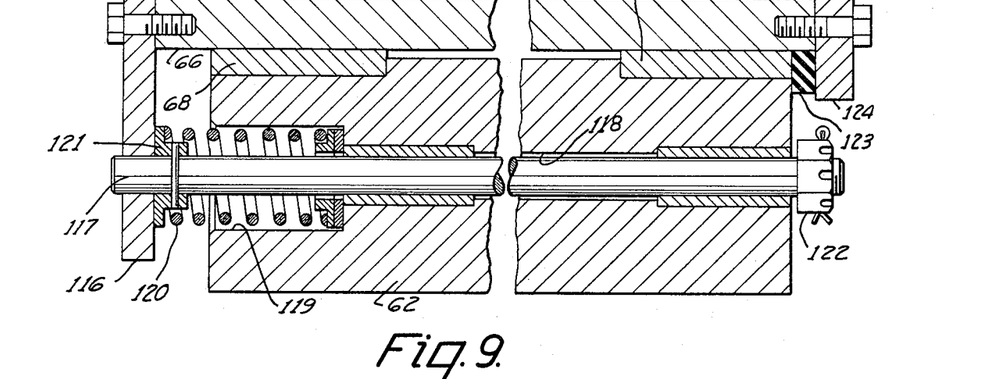
FIGURE 9 is a fragmentary sectional view on an enlarged scale taken along line 9—9 of FIGURE 8.

As shown in FIGURE 7, the heads of the jaws 78 are T-shaped and fit into grooves in the members 79. This insures that the jaws will follow the movement of the jaw-supporting segments 79 and also makes it possible easily to change the jaws for different size workpieces or if undue wear should take place.

In operation of this preferred form of the invention, air under pressure is admitted to the inflatable annular members 87 and 88 at the end of the working stroke of the saddle 11 and released at the end of the return stroke so that the chucks 60 grip the workpieces firmly during the return stroke of the saddle. As described above, the chucks 60 are rotated in synchronism with the entry chucks 31 and 32. The workpieces, whether grasped by entry chucks, the exit chucks, or both, rotate in synchronism with the rotation of all of the chucks. The exit chucks 60 release the workpieces during the working stroke of the rolls and therefore the workpieces can move easily through the exit chucks in accordance with the elongation that takes place during the working stroke of the saddle and rolls.

In order to provide for the admission and discharge of air to and from the annular members 87 and 88, a bearing sleeve 95 is mounted on the rear end of the spindle 61 and is sealed thereto against leakage of air by O-rings 96. Between the O-rings, the spindle 61 is provided with an annular groove 97 that is machined deeply enough to intersect longitudinally extending bores 98 and 99 in the spindle. Surrounding the end of the spindle in this region, there is a stationary air inlet ring 101 which is supported on the bearing sleeve 95 by retainer rings 102, appropriate packings 103 being disposed between the bearing sleeve 95 and the air inlet ring 101. The bearing sleeve 95 has openings 104 that are axially aligned with the groove 97 and with an inlet opening 105 in the air inlet ring 101. A conduit 106 leads to the opening 105.

Figure 4:
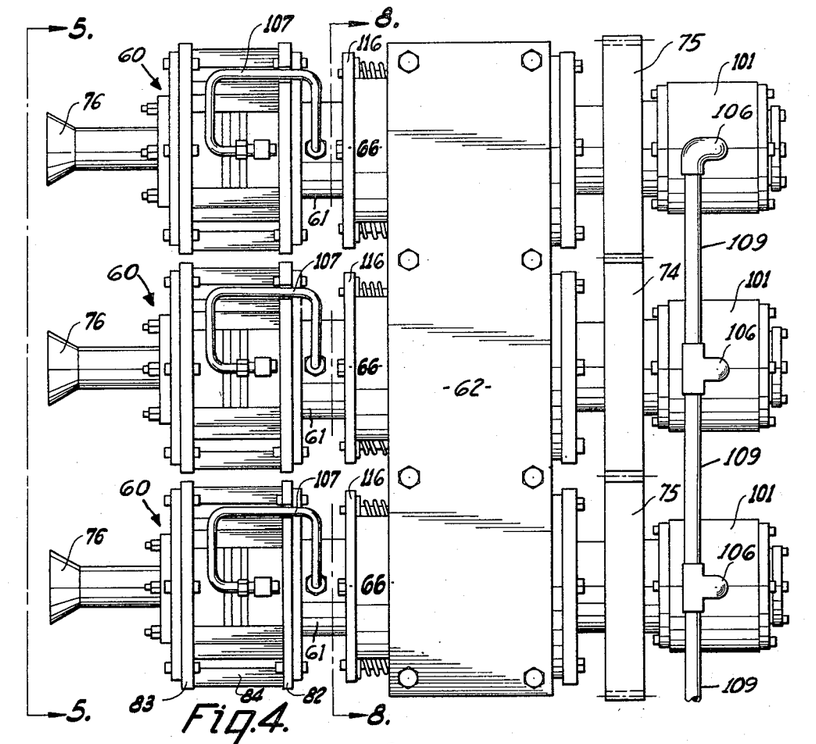
FIGURE 4 is a top plan view of the crosshead and chucks on the exit side of the machine on an enlarged scale.
Figure 5:
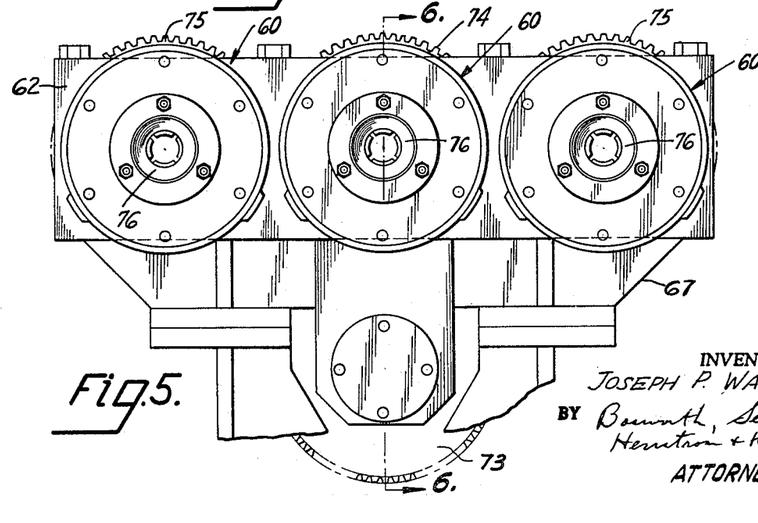
FIGURE 5 is an end elevation of the exit chucks and associated mechanisms, the view being taken as indicated by line 5—5 of FIGURE 4.

At the other end of the spindle, the passage 98 is connected to the annular member 87 by conduit 107 and appropriate fittings, and the passage 99 is connected to the member 88 by conduit 108 and appropriate fittings. As shown in FIGURE 4, the inlet conduits 106 for each of the chuck-operating mechanisms are connected to a manifold 109 that leads to an air supply and appropriate controls to operate the chucks in timed relationship to the reciprocation of the rolls and saddle.

Figure 10:
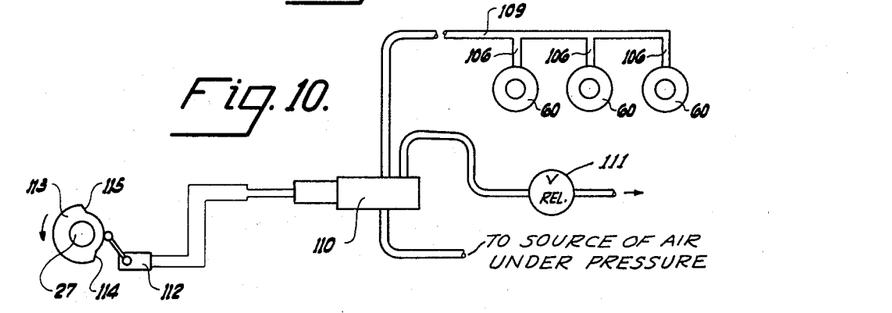
FIGURE 10 is a diagram of the fluid mechanism for actuating the exit chucks.

Operation of the chucks in timed relation to the movement of the saddle may be obtained by any convenient control of the supply of air under pressure to the manifold 109. For example, as shown in FIGURE 10, the manifold 109 may be connected to a solenoid valve 110 which in one position connects the conduit to a source of air under pressure and in the other position permits the pressure within the conduit and hence the pressure within the members 87 and 88 to be exhausted to atmosphere through an adjustable pressure relief valve 111. The solenoid valve 110 is controlled in accordance with the motion of the saddle through a limit switch 112 that is operated by a cam 113 mounted on the crank shaft 27. The cam is positioned on the crank shaft in such a manner that as the saddle reaches the end of its working stroke, the switch is operated to cause the solenoid valve to connect the source of air under pressure to the manifold 109 and thereby inflate the members 87 and 88 and cause the jaws firmly to grip the workpiece. As indicated diagrammatically in FIGURE 10, this occurs when the ramp 114 engages the limit switch. The pressure is maintained on the members 87 and 88 throughout the major portion of the return stroke of the saddle. When the saddle approaches the end of its return stroke, the cam follower of the limit switch rides down the ramp 115 of the cam and the switch operates the solenoid valve 110 to shut off the connection between the source of air under pressure and the manifold 109 and simultaneously to permit the manifold to exhaust through relief valve 111, thus relaxing the firm grip of the chucks on the work. The relief valve can be adjusted to permit the air to exhaust at atmospheric pressure, in which case the jaws will be disengaged from the workpiece, or the valve can be adjusted to maintain a desired pressure that is above atmospheric but below the gripping pressure. It is sometimes desirable to maintain sufficient grip on the workpieces to prevent undesired movement of them from taking place during the working stroke of the rolls, but the grip of the jaws should be relaxed sufficiently to permit the workpieces to slide through the jaws to accommodate the elongation of the workpieces during the working stroke. The proper adjustment of the relief valve can be determined readily during operation of the apparatus.

Inasmuch as the exit chucks 60 firmly grip the workpieces during the time that the work is being rotated and advanced, provision must be made to permit the workpieces to be fed forward by the entry chucks during the return stroke of the saddle and while the chucks 60 firmly grip the workpieces. This is accomplished by slidably mounting the cylindrical supports 66, which carry the spindles 61, in the housing 62. (See FIGURES 4, 6, 8 and 9.) The forward ends of the supports 66 are provided with end plates 116 that are of a generally triangular shape. These carry rods 117 that pass through openings 118 in the housing 62. The openings are provided with bearing inserts for supporting the rods and the openings are enlarged at the forward ends as shown at 119 to receive coil springs 120 that act between appropriate washers and shims at the bases of the openings and spring seat members 121 adjacent the plates 116. At the rear end, each rod is provided with a nut 122 to limit the forward movement of the rods under the influence of the springs 120.

It will be evident that with this construction, when the workpieces are advanced through the mill by the entry chucks during the return stroke of the carriage and at the time that the exit chucks 60 are firmly grasping the workpieces, the exit chucks can move rearwardly along with the workpieces against the action of the springs 120. However, as soon as the carriage reaches the end of its stroke and the air pressure in the exit chucks is reduced to relax the grip of the chucks, the springs 120, acting through the plates 116, slide the supports 66 and the chucks 60 in the forward direction to the limit of their motion, this position being determined by engagement of the bumper 123 with the rear plates 124 that are secured to the supports 66.

With the form of the invention just described, the workpieces are positively rotated throughout their passage through the machine even though they may be disengaged from the entry chucks. The exit chucks 60 engage and rotate the workpieces positively during the period that the trailing ends of the workpieces are released from the entry chucks and are being urged through the machine by engagement with following workpieces. This positive rotation is particularly important with tubes of great length and relatively small diameter.

*Exit chucks for advancing workpieces*

Figure 11:
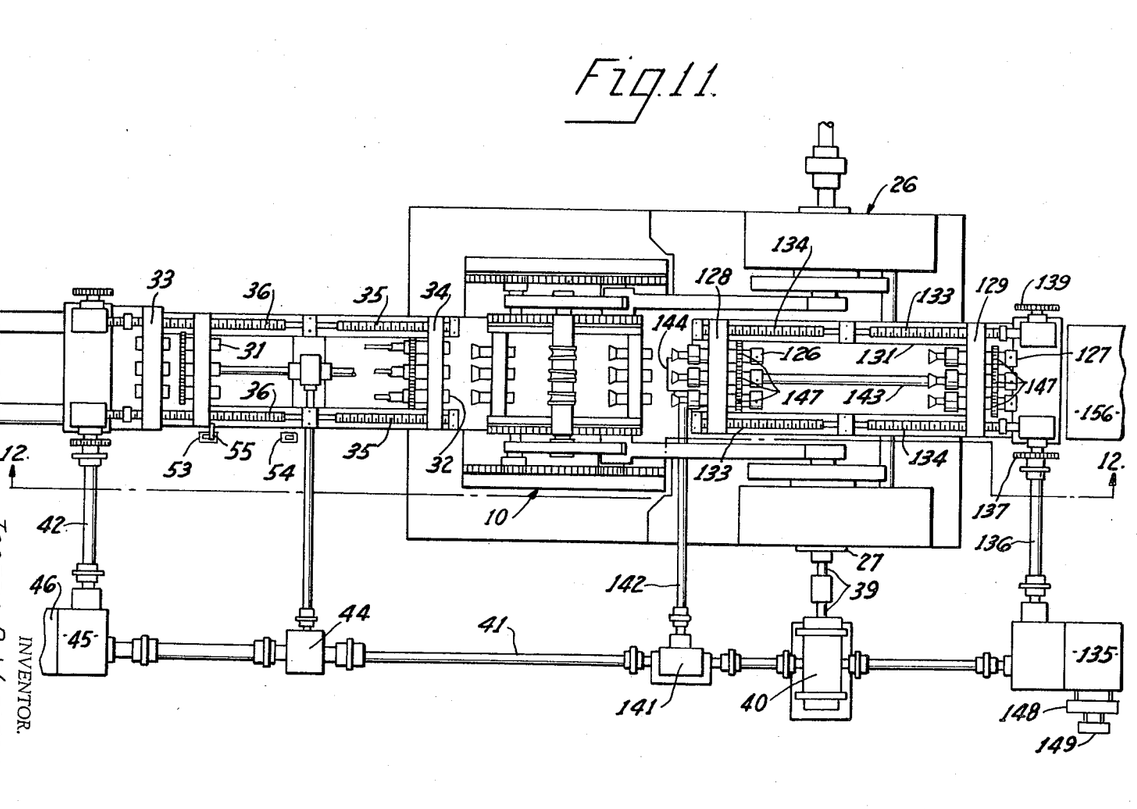
FIGURE 11 is a plan view, with part of the mill housing broken away, of a modified form of the invention, in which the exit chucks not only rotate, but also advance the work.
Figure 12:
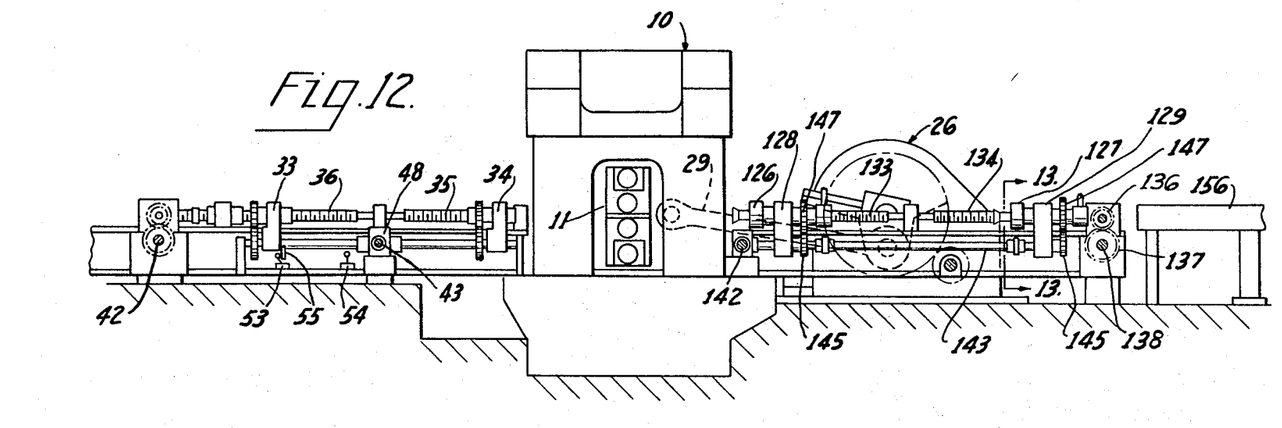
FIGURE 12 is a side elevation of the apparatus shown in FIGURE 11.
Figure 13:
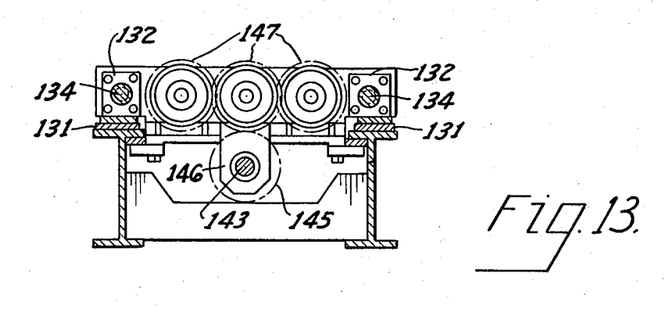
FIGURE 13 is a transverse sectional view taken as indicated by line 13—13 of FIGURE 11.

As explained above, in some instances it is desirable to arrange for advancing, as well as rotating, the workpieces by the exit chucks. An apparatus for carrying out this mode of operation is shown in FIGURES 11, 12 and 13. The machine as a whole is the same at the entry end and through the mill proper as that previously described, and in these figures corresponding parts have been identified with the same reference characters as before. In this form of the invention, however, two sets of exit chucks, 126 and 127, are provided. The chucks 126 and 127 are constructed like the chucks 60 previously described and, like the chucks 60, are arranged alternately to grip and release the workpieces passing through them. However, in this form of the invention, the chucks feed as well as rotate the workpieces.

In order to advance, as well as rotate, the workpieces, the chucks 126 and 127 are carried in crossheads 128 and 129, respectively, which are supported for longitudinal movement on slides 131 carried by the frame of the machine. The crossheads are provided with threaded portions 132 (see FIGURE 13) that engage longitudinally extending screws 133 and 134. The screws 133 and 134 are of the same pitch as screws 35 and 36 previously described, and like screws 35 and 36 are of opposite hand so that upon rotation of the screws 133 and 134, the crossheads 128 and 129 move in opposite directions. The screws 133 and 134 are rotated in synchronism with the screws 35 and 36 through a drive train comprising a reverse gear 135 that is driven from the intermittent drive 40 and drives a transverse shaft 136 that rotates the screws 133 and 134 through gearing 137, shaft 138 disposed at a level below the level of the screws 133 and 134, and gearing 139 that drives the screws on the side of the machine opposite the reverse gear 135 without interference with the discharge of workpieces from the apparatus.

In this form of the invention, the chucks are rotated by means of bevel gearing 141 which drives transverse shaft 142 that rotates shaft 143 through appropriate bevel gearing 144. Shaft 143 is provided with a keyway that extends throughout substantially its entire length and gears 145, carried by depending portions 146 of the crossheads 128 and 129, are slidably keyed to the shaft 143. Gears 145 drive gears 147 mounted on the chucks 126 and 127. Thus, regardless of the positions of the crossheads 128 and 129, the exit chucks 126 and 127 are always rotated in synchronism with the rotation of the entry churcks 31 and 32.

The exit chucks 126 and 127 also function to advance the workpieces through the mill in synchronism with the advance effected by the entry chucks 31 and 32 during the return movement of the carriage. This is accomplished by the drive mechanism just described inasmuch as shaft 136, which drives the screws 133 and 134, is synchronized with the drive for the screws 35 and 36 that advance the entry chucks. The crossheads 128 and 129 move at the same time, in the same direction and for the same distance as the entry crossheads 33 and 34. The advancing operation is essentially the same as that previously described and also described in the aforesaid Krause patent. With the exit chucks in the position shown in FIGURE 11 of the drawings, the screws 133 and 134 are intermittently rotated to move the chucks toward each other during each return stroke of the saddle, the chucks 126 moving away from the mill (i.e., in the advancing direction). While this motion is going on, the chucks 126 firmly engage the workpieces during each return stroke of the saddle and their grip is relaxed during each working stroke. The chucks 126 thus rotate and advance the workpieces in synchronism with the rotation and advance imparted to the workpieces by the entry chucks 31. During this period, the grip of the chucks 127, which are moving toward the mill, is relaxed so that the workpieces can slide through them.

When the exit chucks 126 and 127 (and the entry chucks 31 and 32) approach the limit of their motion towards each other, the reverse gear 135 is actuated by a fluid pressure cylinder 148 that is preferably controlled by a solenoid valve 149. Valve 149 is controlled by limit switch 54 that is engaged by arm 55 on the entry crosshead 33. This reverse direction of rotation of the screws 133 and 134, and the chucks 126 and 127 are caused to move away from each other. At the same time, the air connections to the chucks are reversed so that the chucks 126, which are then moved toward the mill housing, become inactive, while the chucks 127 grasp the workpieces and rotate and advance them during the return stroke of the saddle and permit the workpieces to slide through them during the working stroke of the saddle.

When the chucks again reach their farthest apart positions, the limit switch 53 is actuated by the arm 55 and the operation of the chucks is again reversed. Thus, the exit chucks 126 and 127 are controlled in synchronism with the entry chucks 31 and 32, both as to advancing movement and rotation, and proper feeding and rotation of the workpieces is assured.

Figure 14:
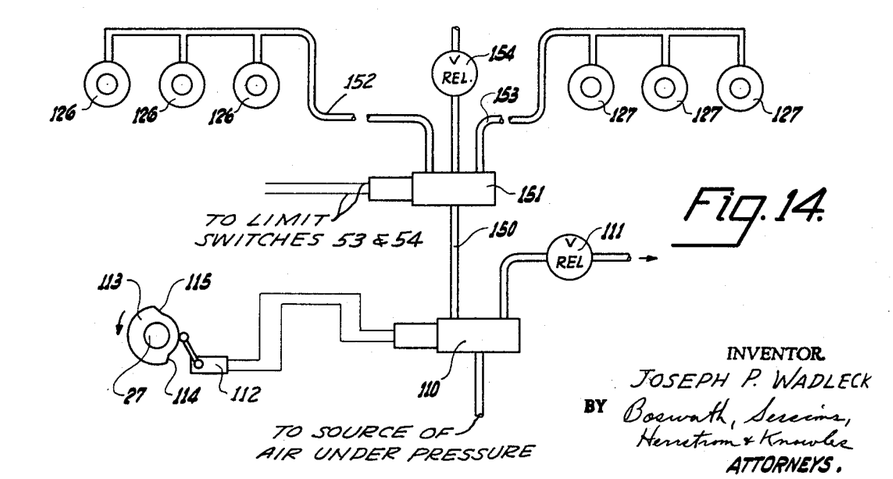
FIGURE 14 is a diagram of the fluid pressure mechanism for the machine shown in FIGURES 11 and 12.

In order to control the actuation of the exit chucks 126 and 127, a fluid pressure system, such as shown diagrammatically in FIGURE 14, may be employed. As in the system shown in FIGURE 10, the supply of air under pressure to the exit chucks 126 or 127 in timed relationship with the movement of the saddle is controlled by a cam 113 mounted on the crank shaft 27. The cam actuates switch 112 which in turn controls valve 110 as before. The arrangement is such that during the return stroke of the saddle, the valve 110 is in a position in which it supplies air under pressure to the chucks 126 or 127, but during the working stroke of the saddle, the source of compressed air is cut off from the chucks and the air under pressure in the chucks is permitted to exhaust through adjustable relief valve 111 as before. In the form of the invention shown in FIGURE 14, however, the valve 110 is connected to a conduit 150 that leads to another solenoid valve 151. Valve 151 in one position connects the conduit 150 to a conduit 152, which leads to the chucks 126, and at the same time connects the conduit 153, which leads to the chucks 127, to atmosphere. In its other position, valve 151 permits the air in the actuating members of chucks 126 to exhaust to atmosphere and connects the conduit 150 and the source of compressed air to the conduit 153 and chucks 127. If it is desired to retain some pressure in the chucks, an adjustable pressure relief valve 154 may be employed as shown.

Valve 151 is controlled by the limit switches 53 and 54 that are actuated, in the form of the invention disclosed herein, by the arm 55 carried by the crosshead 33 on the entry end of the apparatus. The connections are such that when the crossheads 33 and 34 and the exit crossheads 128 and 129 are in the positions shown in FIGURE 10 and have started to move toward each other, the valve 151 is in the position in which air under pressure is supplied from conduit 150 to conduit 152 and thence to the chucks 126, while the chucks 127 are permitted to exhaust through the valve 154. Thus, as the crosshead 128 and the chucks 126 move away from the mill housing in synchronism with the crosshead 33 and the entry chucks 31, the chucks 126 are caused to grasp the workpieces during each return stroke of the saddle 11 and to relax their grip on the workpieces during each working stroke of the saddle, thus grasping the workpieces to advance them and rotate them in synchronism with the motion imparted to the workpieces by the entry chucks 31 while permitting the workpieces to slide through the chucks 126 during the working stroke. At this time, the chucks 127 are inactive and the workpieces simply slide through them. When the crossheads 128 and 129 and 33 and 34 have reached the limits of their motion towards each other, the position of the valve 151 is changed in response to the engagement of the arm 55 with the limit switch 54. Thereupon, the operation is reversed, the motion of the crossheads is reversed, the chucks 126 become idle and simply permit the work to pass through them while the chucks 127 grasp the workpieces to advance and rotate them during each return stroke of the saddle 11 and their grip on the workpieces is relaxed during each working stroke of the saddle 11, this action, of course, being brought about in timed relation with the motion of the saddle by means of the cam 113 and the limit switch 112.

*Summary*

In operation, workpieces are loaded onto the mandrels M at the end of the entry table 155 remote from the mill and are fed over the mandrels into the mill by the entry chucks 31 and 32 in the manner described in the said Krause patent. At the exit end of the machine, however, the operation is greatly improved over the operation of the machine of the Krause patent, particularly where workpieces of small diameter and great length, for example of the order of one-half inch in diameter and seven or eight hundred feet long, are being produced by the apparatus. In the form of the invention illustrated in FIGURES 1 through 10, the workpieces, as they are discharged from the machine, are alternately grasped and released by the exit chucks 60. During the return stroke of the saddle, the workpieces are firmly grasped and at that time they are rotated in synchronism with the rotation imparted to them by the entry chucks 31 or 32, as the case may be. Thus, the workpieces are positively rotated even after they have been released by the entry chucks and even though they may extend on the runout table 156 for a distance of several hundred feet.

In the form of the invention disclosed in FIGURES 11 to 14, the workpieces are not only rotated positively by the exit chucks during the return stroke of the saddle, but also they are advanced in precise synchronism with the advancing motion given them by the entry chucks 31 and 32. This insures that the workpieces will be properly advanced and prevents damage of the ends of the workpieces by engagement with each other, and possible resulting damage to the machine. In both instances, the grip on workpieces by the exit chucks is relaxed during the working stroke of the mill, and therefore the exit chucks permit the workpieces to slide through them in response to the elongation of the workpieces that takes place during each working stroke.

Those skilled in the art will appreciate the various changes and modifications that can be made in the invention without departing from the spirit and scope thereof. The essential characteristics of the invention are summarized in the appended claims.

I claim:

1. In a rolling apparatus having an entry portion, a mill housing and an exit portion, a saddle mounted for reciprocation in the mill housing, a pair of working rolls mounted in the saddle for reciprocation therewith, said rolls being adapted to engage and work an elongated workpiece to reduce the diameter thereof as it is progressed between said rolls, said rolls being in working engagement with said workpiece during a portion of the cycle of reciprocation of said saddle and being out of working engagement with said workpiece during another portion of said cycle, feeding means disposed adjacent the entry end of said mill housing for advancing a workpiece toward the mill housing and rotating it while the rolls are out of working engagement with the workpiece, at least one chuck on the exit side of the mill for engaging the workpiece and rotating it while the rolls are out of working engagement with the workpiece, and means for rotating said chuck in synchronism with the rotation of said rotating means on the entry side of the mill, the improvement which comprises means for operating said chuck firmly to grip a workpiece disposed within it during the time that the chuck is rotated whereby the workpiece is positively rotated and to relax the grip of said chuck on said workpiece while the rolls are in working engagement with the workpiece whereby the elongated workpiece is permitted to move through the chuck in accordance with the elongation of the workpiece that takes place in its passage through the apparatus.

2. A rolling apparatus according to claim 1 having a fluid pressure actuated chuck and means operated in timed relationship with the reciprocation of the saddle for controlling the supply of fluid under pressure to the chuck.

3. A rolling apparatus according to claim 2 wherein the means for controlling the supply of fluid under pressure to the chuck is adapted to supply fluid under relatively high pressure to the chuck to cause it to grip a workpiece firmly during a portion of the cycle of reciprocation of the saddle and to retain fluid under greater than atmospheric pressure in the chuck during the remainder of the cycle of reciprocation of the saddle when the grip of the chuck is relaxed.

4. A rolling apparatus according to claim 1 wherein the chuck comprises a hollow spindle through which the workpiece passes, a plurality of circumferentially arranged and radially movable gripping jaws carried by the spindle, an inflatable annular member surrounding the jaws, means surrounding said annular member to substantially prevent radially outward expansion of said annular member, and means for supplying fluid under pressure to the interior of said annular member to cause it to expand radially inwardly and urge said jaws inwardly into engagement with a workpiece disposed in said chuck.

5. A rolling apparatus according to claim 4 wherein said spindle is rotatably mounted in a longitudinally extending sleeve, the sleeve being supported in a transversely extending member.

6. A rolling apparatus according to claim 1 wherein the chuck is mounted for longitudinal movement, the chuck firmly gripping the workpiece and moving away from the mill housing with the workpiece during advance of the workpiece while the rolls are disengaged from the workpiece.

7. A rolling apparatus according to claim 6 wherein means are provided for returning the chuck to its initial position while the grip of the chuck on the workpiece is relaxed.

8. A rolling apparatus according to claim 7 in which the saddle and the rolls make a working stroke in one direction and a return stroke in the opposite direction and the workpiece is advanced and rotated during the return stroke of the saddle, the grip of the chuck on the workpiece being relaxed during the working stroke of the saddle.

9. A rolling apparatus accoring to claim 8 wherein the chuck comprises a hollow spindle through which the workpiece passes, a plurality of circumferentially arranged and radially movable gripping jaws carried by the spindle, and means for actuating the jaws to cause them to grip a workpiece disposed within the chuck, the spindle being rotatably mounted in a longitudinally extending sleeve, the sleeve being supported in a transversely extending member for longitudinal movement with respect to said transversely extending member, and a spring urging the sleeve toward the mill housing, whereby the chuck is permitted to move away from the mill housing with the workpiece during the advance of the workpiece and is returned toward the mill housing by the spring during the working stroke of the saddle.

10. Apparatus according to claim 9 having means for positively advancing the chuck in synchronism with the advance of the workpiece by the said feeding means during the return stroke of the saddle.

11. Apparatus according to claim 10 wherein the feeding and advancing means in the entry portion of the apparatus comprises a pair of chucks for advancing the tube toward the mill housing, said chucks being spaced longitudinally along the workpiece, means for moving said chucks in opposite directions longitudinally of the workpiece and for periodically reversing the direction of movement of said chucks whereby said chucks alternately approach and withdraw from each other and each chuck alternately moves toward and away from the mill housing, and means for causing whichever chuck is moving toward the mill housing to grasp the workpiece to feed it toward the mill housing and for releasing from the workpiece whichever chuck is moving away from the mill housing, whereby said chucks together advance workpieces toward the mill housing.

12. Apparatus according to claim 11 having a pair of chucks for engaging the workpiece in the exit portion of the apparatus, means for moving said chucks in opposite directions longitudinally of the workpiece in synchronism with the movement of the chucks in the feeding and rotating mechanism on the entry side of the apparatus, means for causing whichever chuck is moving away from the mill housing to grasp a workpiece to feed it away from said mill housing in synchronism with the feeding action of the feeding and rotating mechanism on the entry side of the apparatus and for releasing from the workpiece whichever chuck is moving toward said mill housing, whereby said chucks together continuously move workpieces away from the mill housing in synchronism with the advancing movement effected by the feeding and rotating means on the entry side of the mill, and means for releasing the grip of both said chucks from the workpiece during the working stroke of the saddle.

References Cited

UNITED STATES PATENTS

| | | | |
|---|---|---|---|
| 1,890,803 | 12/1932 | Coe | 72—252 |
| 2,153,839 | 1/1937 | Liebergeld | 72—189 |
| 2,534,527 | 12/1950 | Myers | 279—4 |
| 3,030,835 | 4/1962 | Krause | 72—209 |

CHARLES W. LANHAM, *Primary Examiner.*

E. M. COMBS, *Assistant Examiner.*